US008853589B2

(12) United States Patent
Krink et al.

(10) Patent No.: US 8,853,589 B2
(45) Date of Patent: Oct. 7, 2014

(54) NOZZLE FOR A LIQUID-COOLED PLASMA TORCH AND PLASMA TORCH HEAD HAVING THE SAME

(75) Inventors: Volker Krink, Finsterwalde (DE); Frank Laurisch, Finsterwalde (DE); Timo Grundke, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 430 days.

(21) Appl. No.: 13/382,067

(22) PCT Filed: May 31, 2010

(86) PCT No.: PCT/DE2010/000608
§ 371 (c)(1), (2), (4) Date: Feb. 24, 2012

(87) PCT Pub. No.: WO2011/000337
PCT Pub. Date: Jan. 6, 2011

(65) Prior Publication Data

US 2012/0138579 A1 Jun. 7, 2012

(30) Foreign Application Priority Data

Jul. 3, 2009 (DE) ......................... 10 2009 031 857
Dec. 30, 2009 (DE) ......................... 10 2009 060 849

(51) Int. Cl.
*B23K 10/00* (2006.01)
*H05H 1/28* (2006.01)
*H05H 1/34* (2006.01)

(52) U.S. Cl.
CPC ......... *H05H 1/28* (2013.01); *H05H 2001/3478* (2013.01); *H05H 1/34* (2013.01); *H05H 2001/3457* (2013.01)
USPC ...................... 219/121.5; 219/121.49; 219/75

(58) Field of Classification Search
CPC ... H05H 1/28; H05H 1/34; H05H 2001/3478; H05H 1/26; A01B 12/006
USPC ......... 219/121.5, 121.51, 75, 121.49, 121.39, 219/121.36
See application file for complete search history.

(56) References Cited

U.S. PATENT DOCUMENTS

| | | | | |
|---|---|---|---|---|
| 4,390,772 | A * | 6/1983 | Hiratake | 219/121.51 |
| 5,206,481 | A | 4/1993 | Rossner et al. | 219/121.48 |
| 5,756,959 | A | 5/1998 | Freeman et al. | 219/121.49 |
| 6,268,583 | B1 | 7/2001 | Yamaguchi et al. | 219/121.52 |
| 7,132,619 | B2 * | 11/2006 | Conway et al. | 219/121.52 |

(Continued)

FOREIGN PATENT DOCUMENTS

| | | |
|---|---|---|
| DE | 36014 B1 | 2/1965 |
| DE | 1 565 638 | 4/1970 |

(Continued)

*Primary Examiner* — Mark Paschall
(74) *Attorney, Agent, or Firm* — MacDonald, Illig, Jones & Britton LLP; Jonathan M. D'Silva

(57) ABSTRACT

A nozzle for a liquid-cooled plasma torch, comprising a nozzle bore for the exit of a plasma gas jet at a nozzle tip, a first portion, the outer surface of which is substantially cylindrical, and a second portion adjacent thereto towards the nozzle tip, the outer surface of which tapers substantially conically towards the nozzle tip, wherein at least one liquid supply groove and/or at least one liquid return groove is/are provided and extend over the second portion in the outer surface of the nozzle (4) towards the nozzle tip, and wherein the liquid supply groove or at least one of the liquid supply grooves and/or a liquid return groove or at least one of the liquid return grooves also extends/extend over part of the first portion, and there is in the first portion at least one groove which communicates with the liquid supply groove or at least one of the liquid supply grooves or with the liquid return groove or at least one of the liquid return grooves.

21 Claims, 11 Drawing Sheets

(56) References Cited

U.S. PATENT DOCUMENTS

| | | | | |
|---|---|---|---|---|
| 2008/0116179 | A1 | 5/2008 | Cook et al. ............... | 219/121.48 |
| 2008/0210669 | A1 | 9/2008 | Yang et al. ............... | 219/121.49 |
| 2011/0284502 | A1 | 11/2011 | Krink et al. ................ | 219/121.5 |
| 2013/0026141 | A1 * | 1/2013 | Liebold et al. ........... | 219/121.49 |

FOREIGN PATENT DOCUMENTS

| | | | |
|---|---|---|---|
| DE | 83 890 | B1 | 8/1971 |
| DE | 25 25 939 | | 12/1976 |
| DE | 27 06 559 | | 8/1977 |
| DE | 4030541 | A1 | 4/1992 |
| DE | 69224183 | T2 | 6/1998 |
| DE | 692 33 071 | T2 | 3/2004 |
| DE | EP 1 524 887 | A2 | 4/2005 |
| DE | 102007005316 | A1 | 12/2009 |
| DE | WO 2010/040328 | A1 | 4/2010 |
| DE | WO 2011/000337 | A1 | 1/2011 |
| DE | 10 2009 031 857 | A1 | 2/2011 |
| DE | 10 2009 031 857 | B4 | 7/2011 |

* cited by examiner

NOZZLE FOR A LIQUID-COOLED PLASMA TORCH AND PLASMA TORCH HEAD HAVING THE SAME

BACKGROUND

The present invention relates to a nozzle for a liquid-cooled plasma torch and a plasma torch head with said plasma torch.

A plasma is the term used for an electrically conductive gas consisting of positive and negative ions, electrons and excited and neutral atoms and molecules, which is heated thermally to a high temperature.

Various gases are used as plasma gases, such as mono-atomic argon and/or the diatomic gases hydrogen, nitrogen, oxygen or air. These gases are ionised and dissociated by the energy of an electric arc. The electric arc is constricted by a nozzle and is then referred to as a plasma jet.

The parameters of the plasma jet can be heavily influenced by the design of the nozzle and the electrode. These parameters of the plasma jet are, for example, the diameter of the jet, the temperature, the energy density and the flow rate of the gas.

In plasma cutting, for example, the plasma is constricted by a nozzle, which can be cooled by gas or water. In this way, energy densities of up to $2\times10^6$, $W/cm^2$, can be achieved. Temperatures of up to 30,000° C. arise in the plasma jet, which, in combination with the high flow rate of the gas, make it possible to achieve very high cutting speeds on materials.

Plasma torches can be operated directly or indirectly. In the direct operating mode, the current flows from the source of the current, through the electrode of the plasma torch and the plasma jet generated by the electric arc and constricted by the nozzle, directly back to the source of the current via the workpiece. The direct operating mode can be used to cut electrically conductive materials.

In the indirect operating mode, the current flows from the source of the current, through the electrode of the plasma torch, the plasma jet generated by the electric arc and constricted by the nozzle, and through the nozzle back to the source of the current. In the process, the nozzle is subjected to an even greater load than in direct plasma cutting, since it not only constricts the plasma jet, but also establishes the attachment spot for the electric arc. With the indirect operating mode, both electrically conductive and non-conductive materials can be cut.

Because of the high thermal stress on the nozzle, it is usually made from a metallic material, preferably copper, because of its high electrical conductivity and thermal conductivity. The same is true of the electrode holder, though it may also be made of silver. The nozzle is then inserted into a plasma torch, the main elements of which are a plasma torch head, a nozzle cap, a plasma gas conducting member, a nozzle, a nozzle bracket, an electrode quill, an electrode holder with an electrode insert and, in modern plasma torches, a holder for a nozzle protection cap and a nozzle protection cap. The electrode holder fixes a pointed electrode insert made from tungsten, which is suitable when non-oxidising gases are used as the plasma gas, such as a mixture of argon and hydrogen. A flat-tip electrode, the electrode insert of which is made of hafnium for example, is also suitable when oxidising gases are used as the plasma gas, such as air or oxygen. In order to achieve a long service life for the nozzle, it can be cooled with a fluid, such as water. The coolant is delivered to the nozzle via a water supply line and removed from the nozzle via a water return line, and in the process flows through a coolant chamber which is delimited by the nozzle and the nozzle cap.

East German document DD 36014, B1, describes a nozzle. It consists of a material with good conductive properties, such as copper, and has a geometrical shape associated with the plasma torch type concerned, such as a conically shaped discharge space with a cylindrical nozzle outlet. The outer shape of the nozzle is designed as a cone, forming an approximately uniform wall thickness, which is dimensioned such that good stability of the nozzle and good conduction of the heat to the coolant is ensured. The nozzle is located in a nozzle bracket. The nozzle bracket consists of a corrosion-resistant material, such as brass, and has on the inside a centring mount for the nozzle and a groove for a rubber gasket, which seals the discharge space against the coolant. In the nozzle bracket, there are in addition bores offset by 180° for the coolant supply and return lines. On the outer diameter of the nozzle bracket there is a groove for an O-ring for sealing the coolant chamber towards the atmosphere and a thread and a centring mount for a nozzle cap. The nozzle cap, likewise made of corrosion-resistant material, such as brass, is shaped with an acute angle and has a wall thickness designed to make it suitable for dissipating radiant heat to the coolant. The smallest internal diameter is provided with an O-ring. For a coolant, it is simplest to use water. This arrangement is intended to facilitate the manufacture of the nozzles, while making sparing use of materials. This arraignment also makes it possible to replace the nozzles quickly and to swivel the plasma torch relative to the workpiece thanks to the acute-angled shape, thus enabling slanting cuts.

The published German patent application DE 1 565 638, describes a plasma torch, preferably for plasma arc cutting materials and for welding edge preparation. The slender shape of the torch head is achieved by using a particularly acute-angled cutting nozzle, the internal and external angles of which are identical to one another and also identical to the internal and external angles of the nozzle cap. Between the nozzle cap and the cutting nozzle, a space is formed for coolant, in which the nozzle cap is provided with a collar, which establishes a metallic seal with the cutting nozzle so that a uniform annular gap is formed as the coolant chamber. The coolant, generally water, is supplied and removed via two slots in the nozzle bracket arranged so as to be offset by 180° to one another.

In German document DE 25 25 939, a plasma arc torch, especially for cutting or welding, is described, in which the electrode holder and the nozzle body form an exchangeable unit. The external coolant supply is formed substantially by a coupling cap surrounding the nozzle body. The coolant flows through channels into an annular space formed by the nozzle body and the coupling cap.

German document DE 692 33 071, T2, relates to an electric arc plasma cutting apparatus. It describes an embodiment of a nozzle for a plasma arc cutting torch formed from a conductive material and having an outlet opening for a plasma gas jet and a hollow body section designed such that it has a generally conical thin-walled configuration which is slanted towards the outlet opening and has an enlarged head section formed integrally with the body section, the head section being solid, except for a central channel, which is aligned with the outlet opening and has a generally conical outer surface, which is also slanted towards the outlet opening and has a diameter adjacent to that of the neighbouring body section which exceeds the diameter of the body section, in order to form a cut-back recess. The electric arc plasma cutting apparatus possesses a secondary gas cap. In addition, there is a water-cooled cap disposed between the nozzle and the secondary gas cap in order to form a water-cooled chamber for the external surface of the nozzle for a highly efficient cooler. The nozzle is characterised by a large head, which surrounds an outlet opening for the plasma jet, and a sharp undercut or recess to a conical body. This nozzle construction assists cooling of the nozzle.

In the plasma torches described above, the coolant is supplied to the nozzle via a water flow channel and removed from the nozzle via a water return channel. These channels are usually offset from one another by 180°, and the coolant is supposed to flow around the nozzle as uniformly as possible on the way from the supply line to the return line. Nevertheless, overheating frequently occurs in the vicinity of the nozzle channel.

A different coolant flow for a torch, preferably a plasma torch, especially for plasma welding, plasma cutting, plasma fusion and plasma spraying purposes, which can withstand the high thermal loads in the nozzle and the cathode is described in East German document DD 83890, B1. In this case, for cooling the nozzle, a coolant guide ring which can easily be inserted into and removed from the nozzle holding part is provided, which has a peripheral shaped groove to restrict the flow of cooling medium to a thin layer no more than 3, mm thick along the outer nozzle wall. More than one, preferably two to four, coolant lines arranged in a star shape relative to the shaped groove and radially and symmetrically to the nozzle axis and in a star shape relative to the latter are provided at an angle of between 0, and 90° and lead into the shaped groove in such a way that they each have two cooling medium outlets next to them and each cooling medium outlet has two cooling medium inlets next to it.

Such arrangement for its part has the disadvantage that greater effort is required for the cooling, because of the use of an additional component, the coolant guide ring. Furthermore, the entire arrangement becomes bigger as a result.

SUMMARY

The invention is thus based on the problem of avoiding overheating in the vicinity of the nozzle channel or the nozzle bore. The invention solves this problem by providing a nozzle, a nozzle bracket, and a nozzle cap, the nozzle cap and the nozzle forming a coolant chamber which can be connected via two bores, each offset by 60° to 180°, to a coolant supply line or coolant return line, the nozzle bracket being designed such that the coolant flows into the coolant chamber virtually perpendicularly to the longitudinal axis of the plasma torch head, encountering the nozzle, and/or virtually perpendicularly to the longitudinal axis out of the coolant chamber and into the nozzle bracket.

In addition, the present invention provides a nozzle for a liquid-cooled plasma torch comprising a nozzle bore for the exit of a plasma gas jet at a nozzle tip, a first portion, the outer surface of which is substantially cylindrical, and a second portion adjacent to it towards the nozzle tip, the outer surface of which tapers substantially conically towards the nozzle tip. At least one liquid supply groove and/or at least one liquid return groove is/are provided, extending via the second portion in the outer surface of the nozzle towards the nozzle tip. The liquid supply groove or at least one of the liquid supply grooves and/or a liquid return groove or at least one of the liquid return grooves also extend(s) via part of the first portion. In the first portion there is at least one first portion groove, which communicates with the liquid supply groove or at least one of the liquid supply grooves or with the liquid return groove or at least one of the liquid return grooves. "Substantially cylindrical" means that the outer surface is generally cylindrical, at least if the grooves, such as the liquid supply and return grooves, are ignored. By analogy, "tapers substantially conically" means that the outer surface tapers generally conically, at least if the grooves, such as the liquid supply and return grooves, are ignored.

According to a particular embodiment of the plasma torch head, the nozzle has at least one liquid supply groove and at least one liquid return groove, and the nozzle cap has on its inner surface at least three recesses, the openings facing the nozzle each extending over a radian ($b_2$), wherein the radian ($b_4$; $c_4$; $d_4$; $e_4$) of the outwardly projecting portions of the nozzle adjacent in the circumferential direction to the liquid supply groove(s) and/or liquid return groove(s), opposite the liquid supply groove(s) and/or liquid return groove(s) is in each case at least as great as the radian ($b_2$). In this way, a shunt from the coolant supply to the coolant return is avoided in a particularly elegant manner.

In addition, the invention contemplates that for the plasma torch head, the two bores each extend substantially parallel to the longitudinal axis of the plasma torch head. This makes it possible to connect coolant lines to the plasma torch head in a space-saving manner.

In some contemplated embodiments of the invention, the bores can be arranged offset by 180°. The invention also contemplates that in some possible embodiments, the radian of the portion between the recesses in the nozzle cap is advantageously no more than half as big as the minimum radian of the liquid return groove(s) and/or the minimum radian of the liquid supply groove(s) of the nozzle. In one particular contemplated embodiment of the nozzle, at least two liquid supply grooves and/or at least two liquid return grooves are provided.

In some contemplated embodiments, the center point of the liquid supply groove or at least one of the liquid supply grooves and the center point the liquid return groove or at least one of the liquid return grooves are advantageously arranged so as to be offset by 180° relative to one another over the periphery of the nozzle.

It is further contemplated that the width of the liquid supply groove or at least one of the liquid supply grooves and/or the width the liquid return groove or at least one of the liquid return grooves can be advantageously in the range from 10° to 270° in the circumferential direction. According to one particular embodiment, the sum of the widths of the liquid supply and/or return grooves is between 20° and 340°. In some contemplated embodiment the sum of the widths of the liquid supply and/or return grooves can be between 60° and 300°.

It is also contemplated that the groove or one of the grooves can extend over the entire periphery in the circumferential direction of the first portion of the nozzle. In particular, it may be contemplated in this context that the groove or one of the grooves can extend over an angle $\zeta 1$ or $\zeta 2$ in the circumferential direction of the first portion of the nozzle. In particular, it may be contemplated in this context that the groove or at least one of the grooves can extend over an angle $\zeta 1$ or $\zeta 2$ in the range from 90° to 270° in the circumferential direction of the first portion of the nozzle.

In a further contemplated embodiment of the nozzle, exactly two liquid supply grooves and exactly two liquid return grooves are provided. In such embodiments, the two liquid supply grooves can be disposed over the periphery of the nozzle symmetrically to a straight line extending from the center point of the liquid return grooves at a right angle through the longitudinal axis of the nozzle, and the two liquid return grooves can be disposed over the periphery of the nozzle symmetrically to a straight line extending from the center point of the liquid supply groove at a right angle through the longitudinal axis of the nozzle.

In some embodiments, the center points of the two liquid supply grooves and/or the center points of the two liquid return grooves can be advantageously arranged so as to be offset relative to one another over the periphery of the nozzle by an angle in the range from 20° to 180°. It is also contemplated that in some embodiments the two liquid supply grooves and/or the two return grooves can communicate with one another in the first portion of the nozzle.

In some embodiments it is advantageous for at least one of the grooves to extend beyond the liquid supply groove or at least one of the liquid supply grooves or beyond the liquid return groove or at least one of the liquid return grooves.

The invention recognizes that by supplying and/or removing the coolant at a right angle to the longitudinal axis of the plasma torch head instead of—as in the state of the art—parallel to the longitudinal axis of the plasma torch head, better cooling of the nozzle is achieved due to the distinctly longer contact between the coolant and the nozzle and due to the fact that the coolant is guided through grooves in the nozzle in the cylindrical region towards the nozzle bracket.

If more than one liquid supply groove is provided in the region of the nozzle tip, particularly good turbulence of the coolant can be achieved as a result of the collision of the streams of coolant, which is usually also accompanied by better cooling of the nozzle.

BRIEF DESCRIPTION OF THE DRAWINGS

Further features and advantages of the invention will become clear from the enclosed claims the following description, in which a number of embodiments of the invention are illustrated in detail with reference to the schematic drawings, wherein

DETAILED DESCRIPTION

It will be appreciated that throughout the current description of the invention, a groove can also mean a flattened region. It will be further appreciated that throughout the current description, embodiments of nozzles are described which have at least one liquid supply groove, here referred to as a coolant supply groove, and at least one liquid return groove, here referred to as a coolant return groove. Several contemplated embodiments include exactly one or exactly two coolant supply grooves and coolant return grooves. However, the invention contemplates that any number of coolant supply grooves and exactly one or exactly two coolant return grooves are possible. It is therefore possible for a larger number of liquid supply and return grooves to be present and/or for the number of liquid supply and return grooves to be different.

Figure 1:
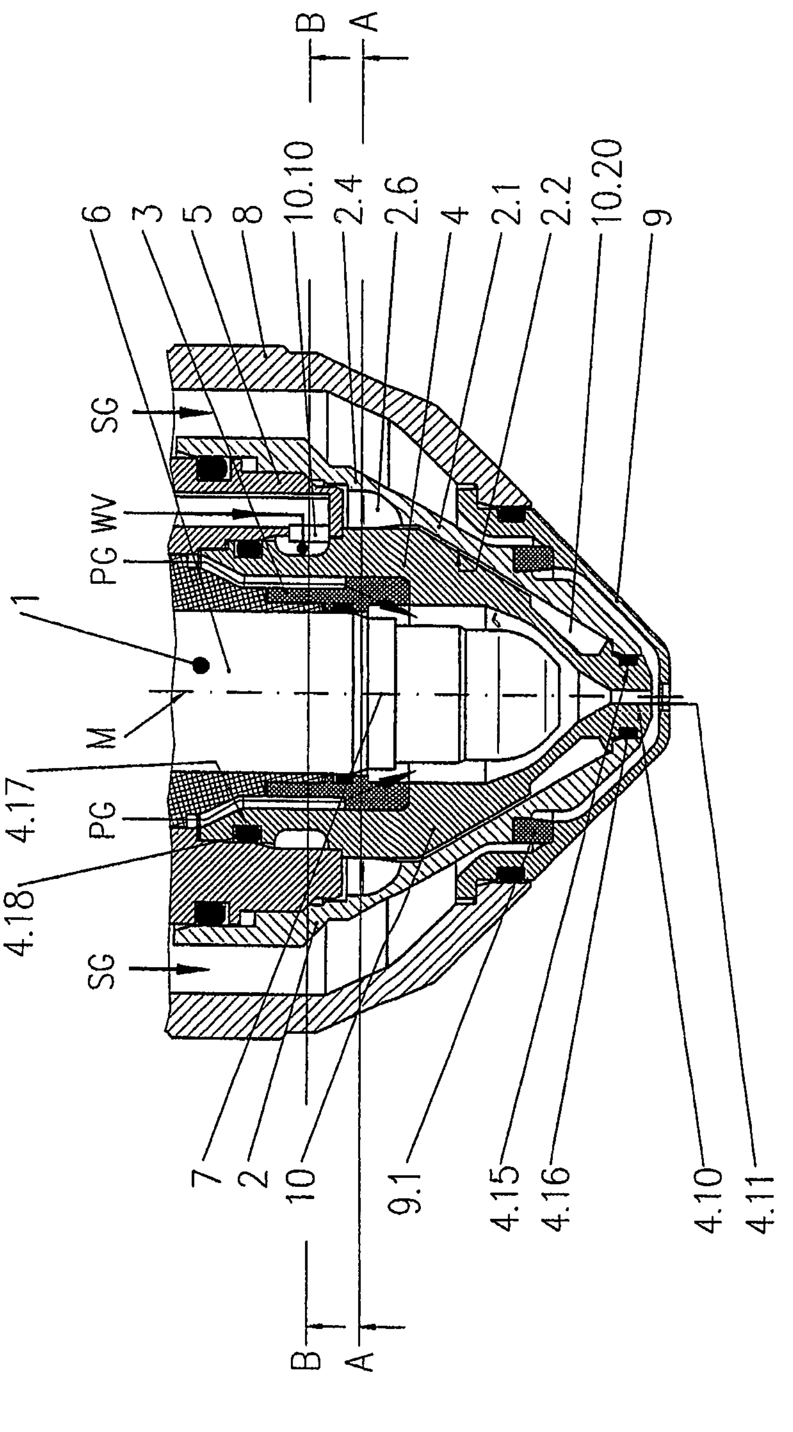
FIG. 1 depicts a longitudinal section view through a plasma torch head with a plasma and secondary gas supply line with a nozzle in accordance with a particular embodiment of the invention.

The plasma torch head 1 shown in FIG. 1 has an electrode holder 6, with which it holds an electrode 7 via a thread (not shown) in the present case. The electrode 7 is designed as a flat-tip electrode. For the plasma torch, it is, for example, possible to use air or oxygen as the plasma gas (PG). A nozzle 4 is held by a substantially cylindrical nozzle bracket 5. A nozzle cap 2, which is attached to the plasma torch head 1 via a thread (not shown), fixes the nozzle 4 and, together with the latter, forms a coolant chamber. The coolant chamber is sealed between the nozzle 4 and the nozzle cap 2 by a seal which takes the form of an O-ring 4.16, and which is located in a groove 4.15 in the nozzle 4, and is sealed between the nozzle 4 and the nozzle bracket 5 by a seal which takes the form of an O-ring 4.18, and which is located in a groove 4.17.

Figure 1A:
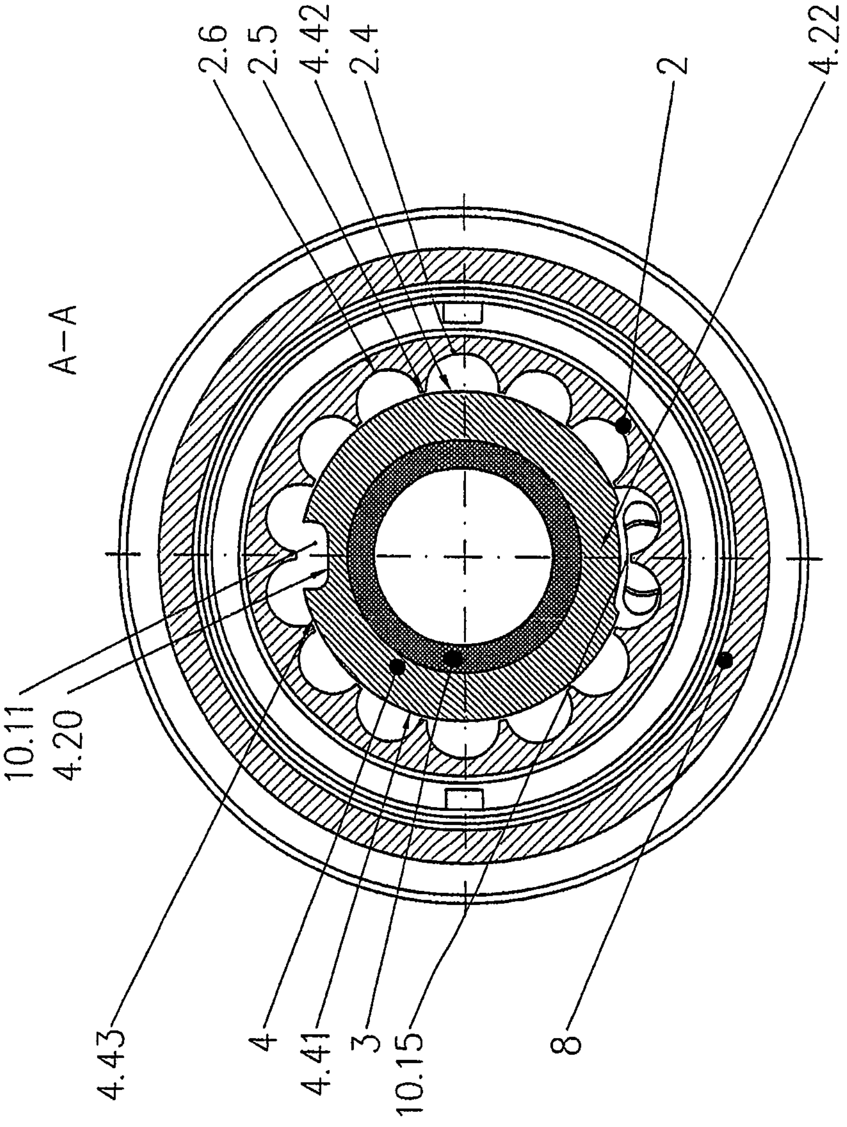
FIG. 1*a*, depicts a section view along line A-A in FIG. 1.
Figure 1B:
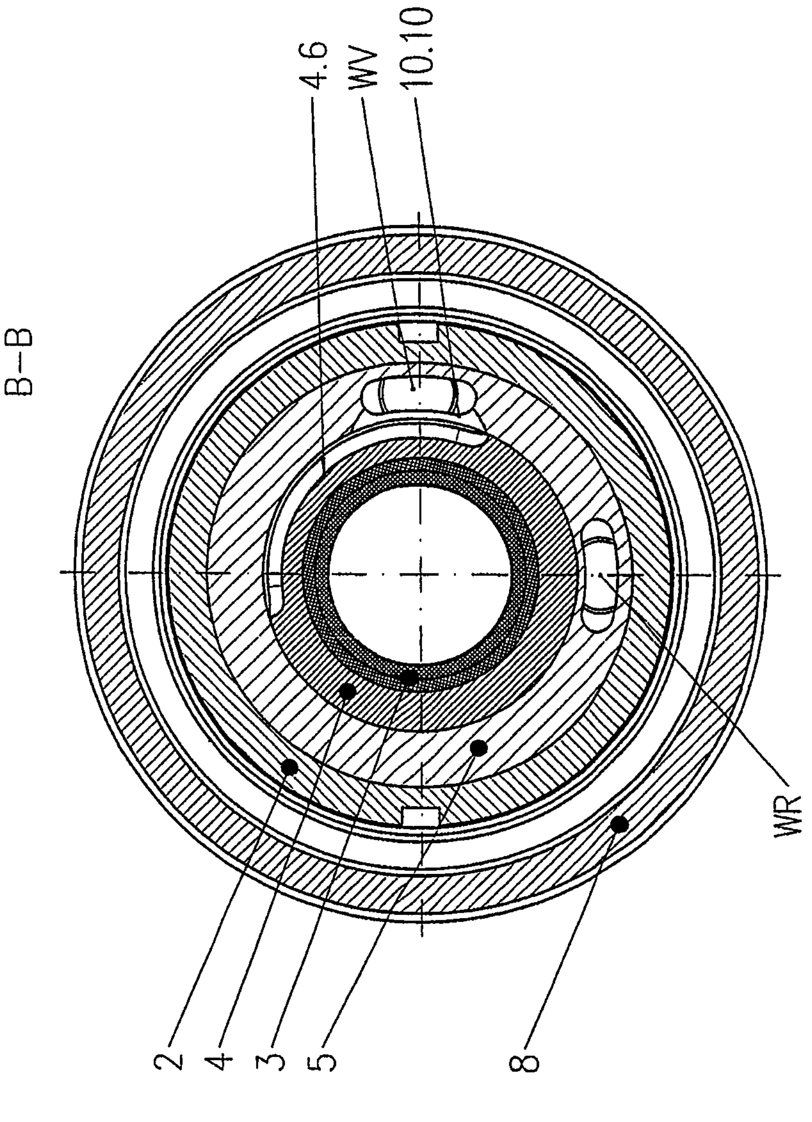
FIG. 1*b*, depicts a section view along line B-B in FIG. 1.

A coolant, e.g. water or water with antifreeze added, flows through the coolant chamber from a bore of the coolant supply line WV to a bore of the coolant return line WR, wherein the bores are arranged so as to be offset by 90° relative to one another (see FIG. 1*b*).

In prior art plasma torches, it has been repeatedly found that the nozzle 4 overheats in the region of the nozzle bore 4.10. Overheating may, however, also occur between a cylindrical portion 4.1 (see FIG. 2) of the nozzle 4 and the nozzle bracket 5. This applies in particular to plasma torches operated with a high pilot current or operated indirectly. This is manifested by a discoloration of the copper after a short period of operation. In this case, even at currents of 40, A, discoloration already occurs after a short time (e.g. 5, minutes). Likewise, the sealing point between the nozzle 4 and the nozzle cap 2 is overloaded, which leads to damage to the O-ring 4.16 and thus to leaks and the escape of coolant. Studies have shown that this effect occurs in particular on the side of the nozzle 4 facing the coolant return line. It is believed that the region subjected to the highest thermal load, the nozzle bore 4.10 of the nozzle 4 is insufficiently cooled, because the coolant flows inadequately through the part 10.20 of the coolant chamber 10 closest to the nozzle bore and/or does not reach it at all, in particular on the side facing the coolant return line.

In the plasma torch head of the invention depicted in FIG. 1, the coolant is fed into the coolant chamber virtually perpendicularly to the longitudinal axis of the plasma torch head 1 from the nozzle bracket 5, encountering the nozzle 4. For this purpose, in a deflection space 10.10 of the coolant chamber, the coolant is deflected from the direction parallel to the longitudinal axis in the bore of the coolant supply line WV of the plasma torch in the direction of the first portion 4.1 (see FIG. 2) virtually perpendicularly to the longitudinal axis of the plasma torch head 1. The coolant then flows through a first portion groove 4.6 (see FIGS. 1*b*, and 2), which extends in the circumferential direction of the first portion 4.1 on part of the circumference, i.e. over approx. 110°, into the part 10.11 formed by a coolant supply groove 4.20 (see FIGS. 1*a*,, 1*b*, and 2) of the nozzle 4 and the nozzle cap 2 into the part 10.20 of the coolant chamber surrounding the nozzle bore 4.10, and there flows around the nozzle 4. The coolant then flows through a space 10.15 formed by a coolant return groove 4.22 of the nozzle 4 and the nozzle cap 2 back to the coolant return line WR, wherein the transition there occurs substantially parallel to the longitudinal axis of the plasma torch head (not shown).

In addition, the plasma torch head 1 is equipped with a nozzle cover guard bracket 8 and a nozzle cover guard 9. It is through this region that a secondary gas SG flows, which surrounds the plasma jet. In the process, the secondary gas SG flows through a secondary gas line 9.1, which can cause it to rotate.

FIG. 1*a*, shows a section view along the line A-A of the plasma torch from FIG. 1. This depiction demonstrates how the part 10.11 formed by the coolant supply groove 4.20 of the nozzle 4 and the nozzle cap 2 prevents a shunt between the coolant supply line and the coolant return line due to portions 4.41 and 4.42 of outwardly projecting regions 4.31 and 4.32 of the nozzle 4 in combination with the inner surface 2.5 of the nozzle cap 2. This arrangement achieves effective cooling of the nozzle 4 in the region of the nozzle tip and prevents thermal overloading. It is ensured that as much coolant as possible reaches the part 10.20 of the coolant space. During experiments, no discoloration of the nozzle in the region of the nozzle bore 4.10 occurred any longer, nor did any further leaks occur between the nozzle 4 and the nozzle cap 2, and the O-ring 4.16 did not exhibit further overheating.

FIG. 1*b*, contains a section view along the line B-B of the plasma torch head from FIG. 1, showing the plane of the deflection space 10.10 and the connection of the coolant supply line via the first portion groove 4.6 in the nozzle 4 running round approx. 110° and the bores for the coolant supply line WV and the coolant return line WR arranged offset by 90°.

Figure 2:
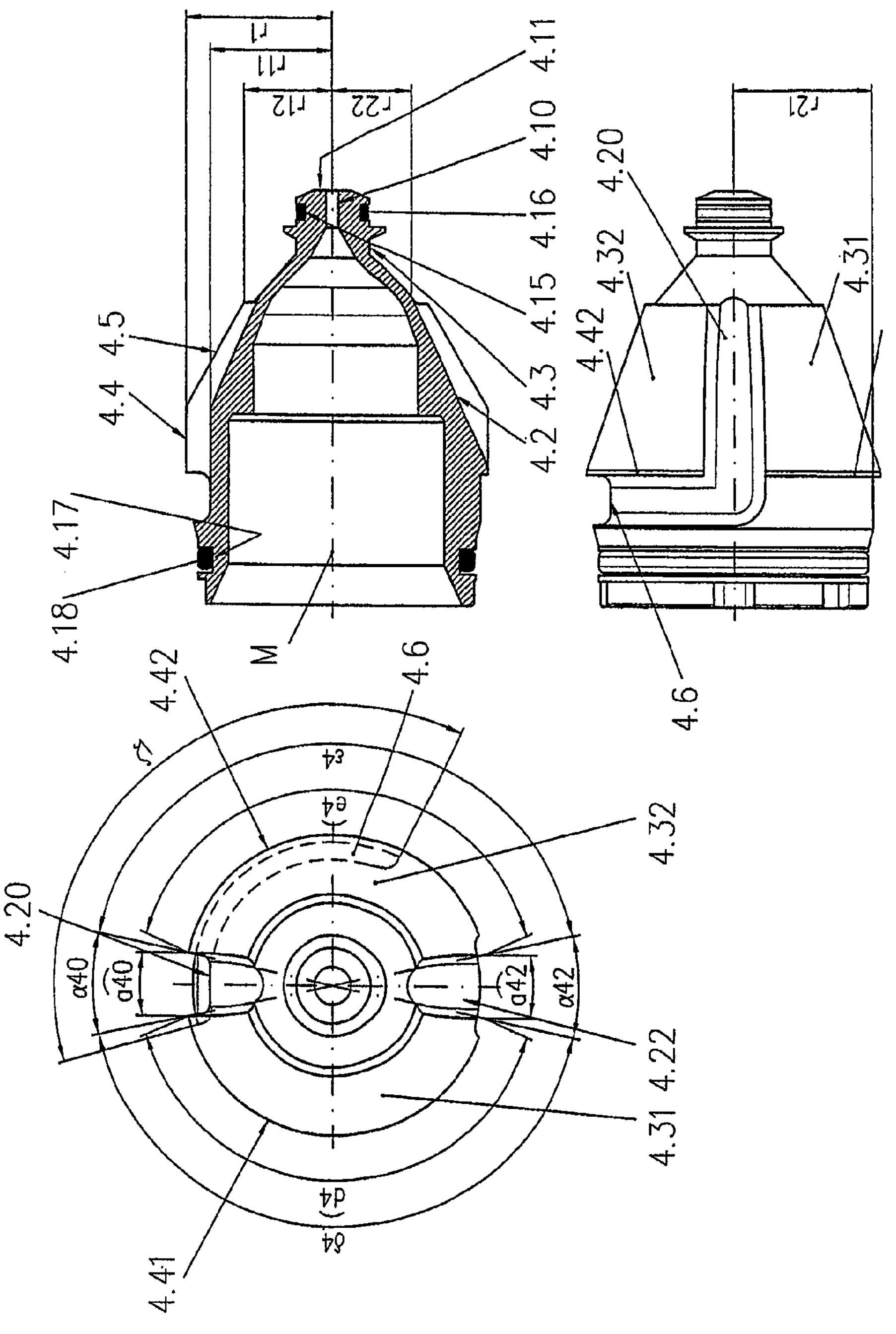
FIG. 2 depicts individual illustrations (top left: plan view from the front; top right: longitudinal section view; bottom right: side view) the nozzle from FIG. 1.

FIG. 2 shows the nozzle 4 of the plasma torch head from FIG. 1. A nozzle bore 4.10 allows for the exit of a plasma gas jet at a nozzle tip 4.11, a first portion 4.1, the outer surface 4.4 of which is substantially cylindrical, and a second portion 4.2 adjacent thereto towards the nozzle tip 4.11, the outer surface 4.5 of which tapers substantially conically towards the nozzle tip 4.11. The coolant supply groove 4.20 extends over a part of the first portion 4.1 and over the second portion 4.2 in the outer surface 4.5 of the nozzle 4 towards the nozzle tip 4.11 and ends before the cylindrical outer surface 4.3. The coolant return groove 4.22 extends over the second portion 4.2 of the nozzle 4. The center point of the coolant supply groove 4.20 and the center point of the coolant return groove 4.22 are arranged so as to be offset by 180° relative to one another over the periphery of the nozzle 4. Between the coolant supply groove 4.20 and the coolant return groove 4.22 are the outwardly projecting regions 4.31 and 4.32 with the associated portions 4.41 and 4.42.

Figure 3:
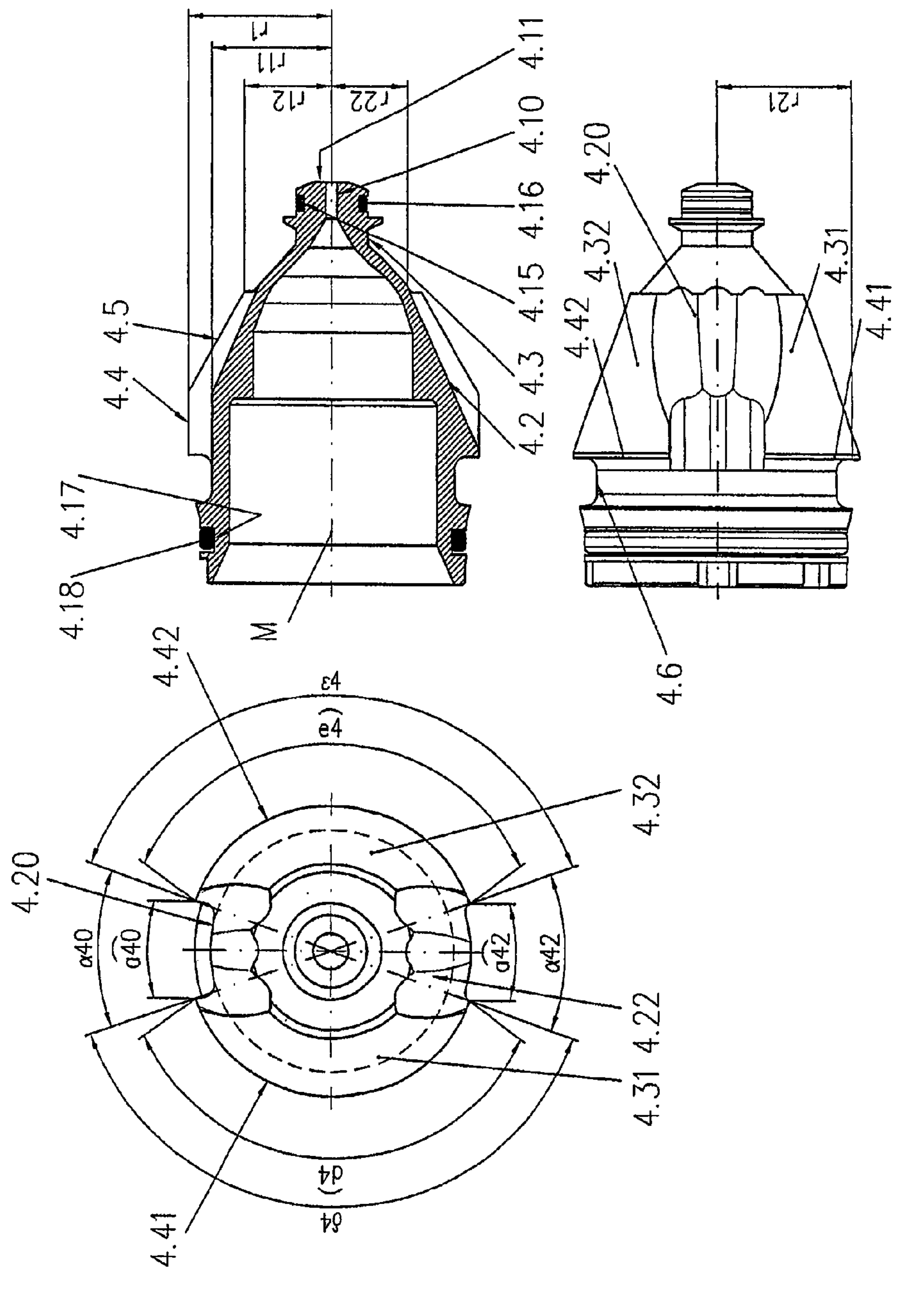
FIG. 3 depicts individual illustrations (top left: plan view from the front; top right: longitudinal section view; bottom right: side view) of a nozzle in accordance with a further particular embodiment of the invention.

FIG. 3 shows a nozzle in accordance with a further contemplated embodiment of the invention, which can also be used in the plasma torch head of FIG. 1. The coolant supply groove 4.20 communicates with a first portion groove 4.6, which extends in the circumferential direction over the entire periphery. This arrangement has the advantage that the bores for the coolant supply line WV and the coolant return line WR can be arranged in the plasma torch head offset by any degree required. Furthermore, this arrangement is advantageous for cooling the transition between the nozzle bracket 5 and the nozzle 4. The same configuration can also be used in principle for a coolant return groove 4.22.

Figure 4:
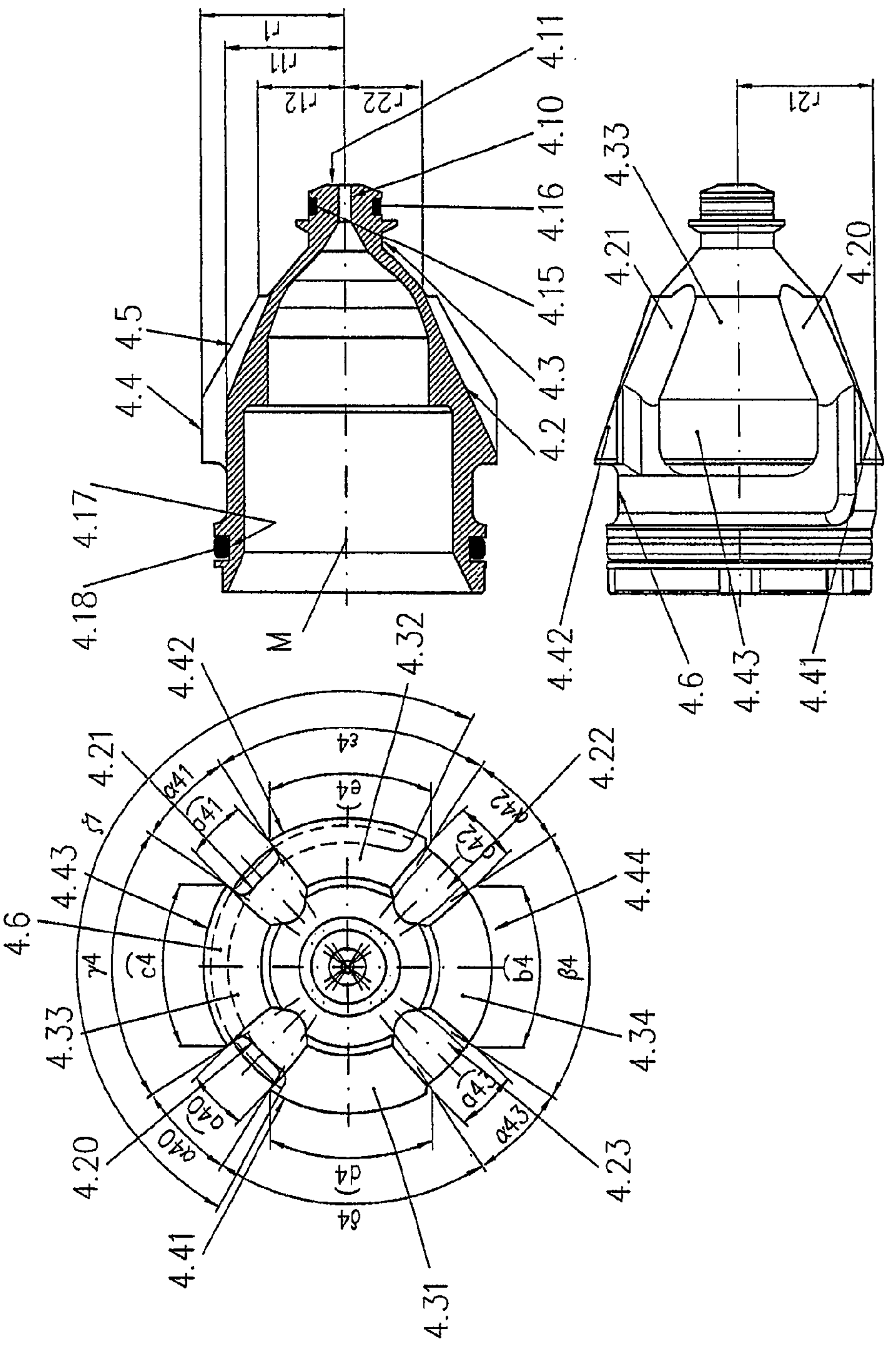
FIG. 4 depicts individual illustrations (top left: plan view from the front; top right: longitudinal section view; bottom right: side view) of a nozzle in accordance with a further particular embodiment of the invention.

FIG. 4 depicts a nozzle in accordance with a further contemplated embodiment of the invention that can also be used in the plasma torch head of FIG. 1. The coolant supply grooves 4.20 and 4.21 extend over a part of the first portion 4.1 and over the second portion 4.2 in the outer surface 4.5 of the nozzle 4 towards the nozzle tip 4.11 and end before the cylindrical outer surface 4.3. The coolant return grooves 4.22 and 4.23 extend over the second portion 4.2 of the nozzle 4. Between the coolant supply grooves 4.20 and 4.21 and the coolant return grooves 4.22 and 4.23 are outwardly projecting regions 4.31, 4.32, 4.33 and 4.34 with associated portions 4.41, 4.42, 4.43 and 4.44. The coolant supply grooves 4.20 and 4.21 communicate with one another via a first portion groove 4.6 of the nozzle 4 extending in the circumferential direction of the first portion 4.1 of the nozzle 4 on a part of the circumference between the grooves 4.20 and 4.21, i.e. over approx. 160°.

Figure 5:
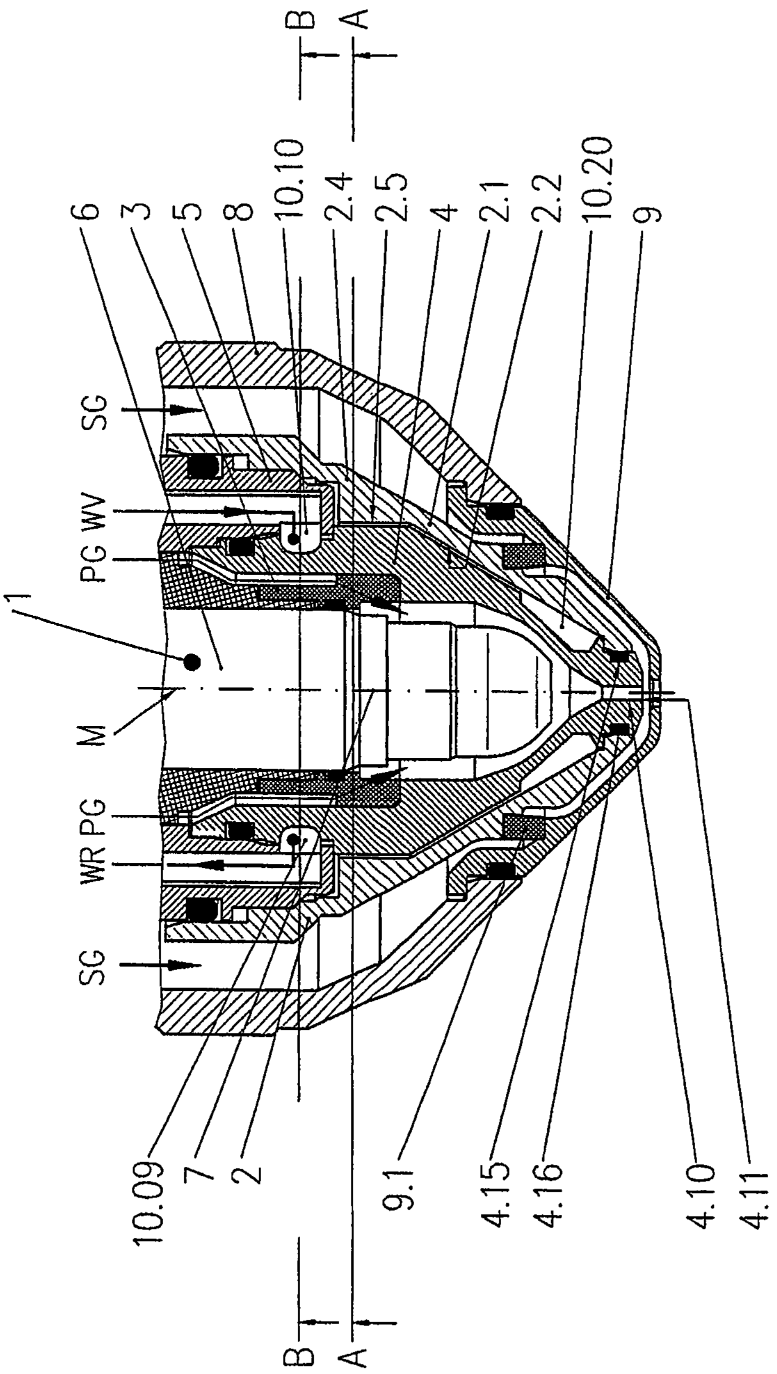
FIG. 5 depicts a longitudinal section view through a plasma torch head with a plasma and secondary gas supply line with a nozzle in accordance with a further particular embodiment of the present invention.

FIG. 5 illustrates a plasma torch head in accordance with a further contemplated embodiment of the invention. In this embodiment, coolant is similarly fed into a coolant chamber virtually perpendicularly to the longitudinal axis of the plasma torch head 1 from a nozzle bracket 5, encountering the nozzle 4. For this purpose, in the deflection space 10.10 of the coolant chamber, the coolant is deflected from the direction parallel to the longitudinal axis in the bore of the coolant supply line WV of the plasma torch in the direction of the first nozzle portion 4.1 virtually perpendicularly to the longitudinal axis of the plasma torch head 1. The coolant then flows through the parts 10.11 and 10.12 (see FIG. 5*a*) formed by the coolant supply grooves 4.20 and 4.21 of the nozzle 4 and the nozzle cap 2 into the region 10.20 of the coolant chamber surrounding the nozzle bore 4.10 and flows around the nozzle 4. The coolant then flows through the parts 10.15 and 10.16 formed by the coolant return grooves 4.22 and 4.23 of the nozzle 4 and the nozzle cap 2 back to the coolant return line WR, wherein the transition here occurs virtually perpendicularly to the longitudinal axis of the plasma torch head, through the deflection space 10.9.

Figure 5A:
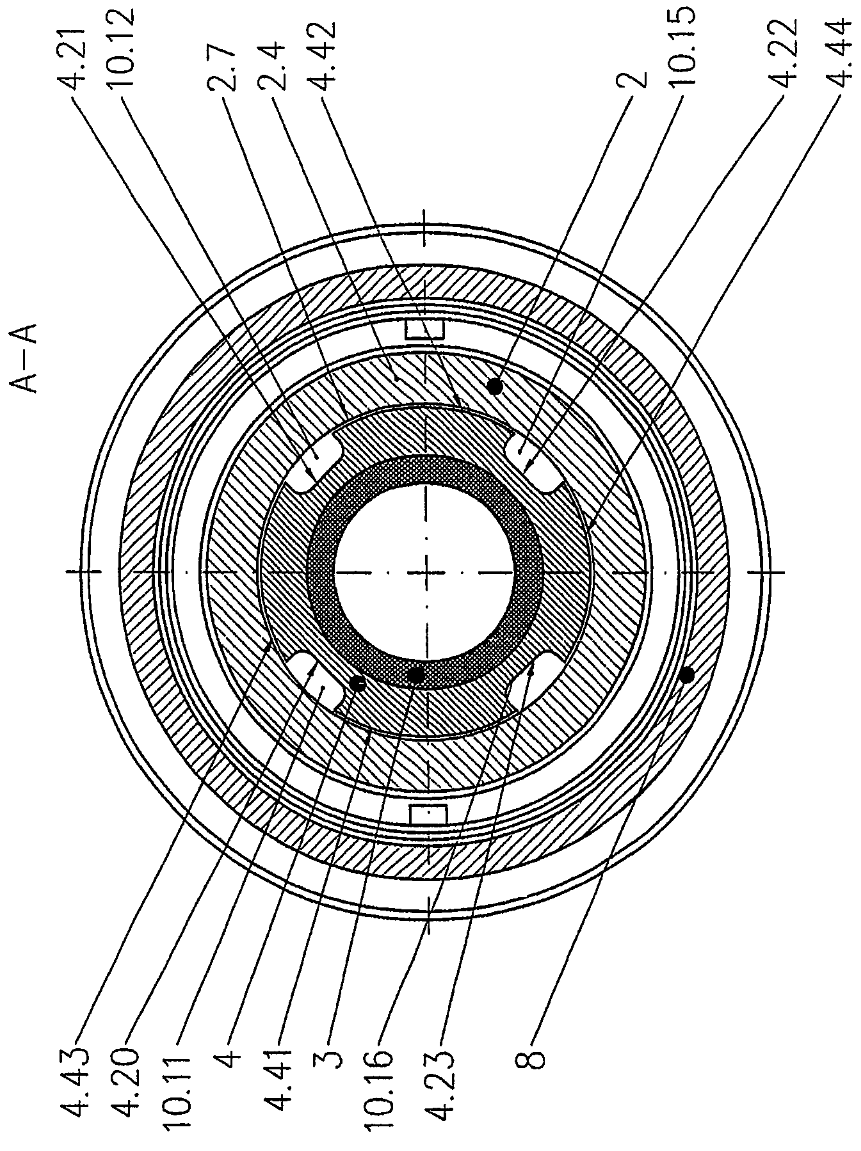
FIG. 5*a*, depicts a section view along line A-A in FIG. 5.

FIG. 5*a*, is a section view along the line A-A of the embodiment plasma torch of FIG. 5 depicting how the parts 10.11 and 10.12 formed by the coolant supply grooves 4.20 and 4.21 of the nozzle 4 and the nozzle cap 2 prevent a shunt between the coolant supply lines and the coolant return lines due to portions 4.41 and 4.42 of the outwardly projecting regions 4.31 and 4.32 of the nozzle 4 in combination with the inner surface 2.5 of the nozzle cap 2. A shunt between the parts 10.11 and 10.12 is prevented by the portion 4.43 of the projecting region 4.33 and between the parts 10.15 and 10.16 by the portion 4.44 of the projecting region 4.43.

Figure 5B:
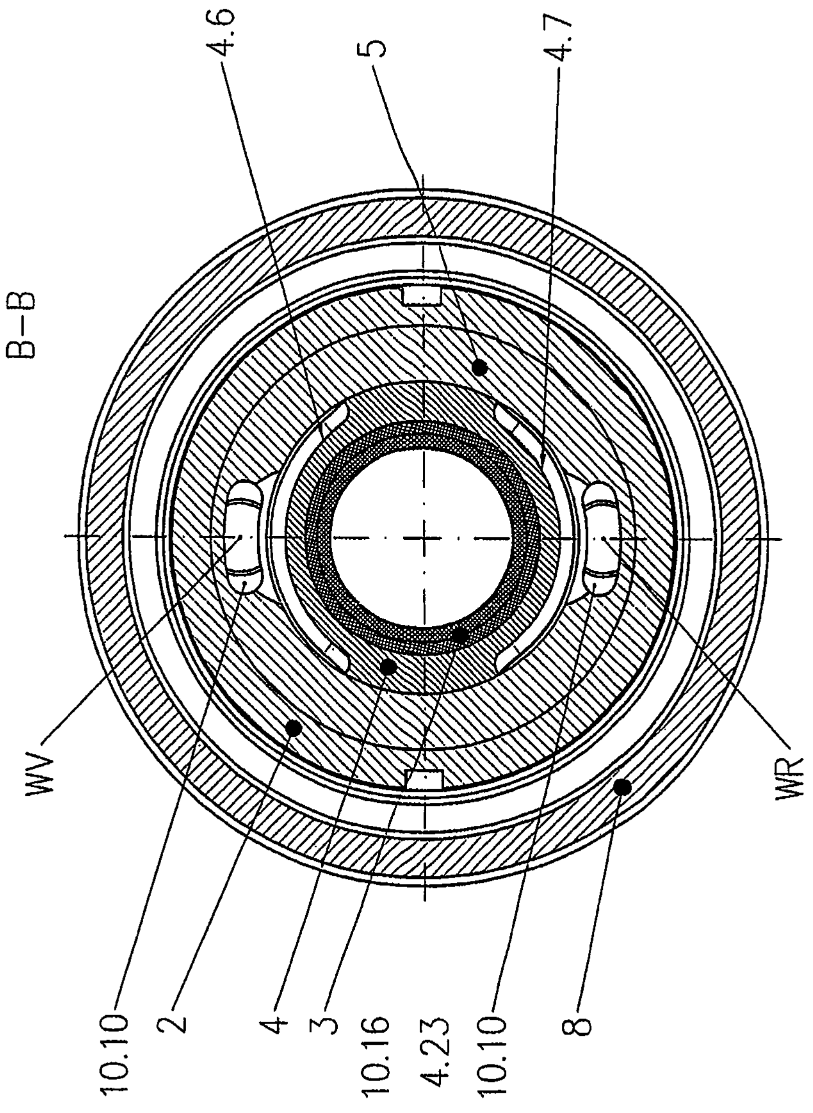
FIG. 5*b*, depicts a section view along line B-B in FIG. 5.
Figure 7:
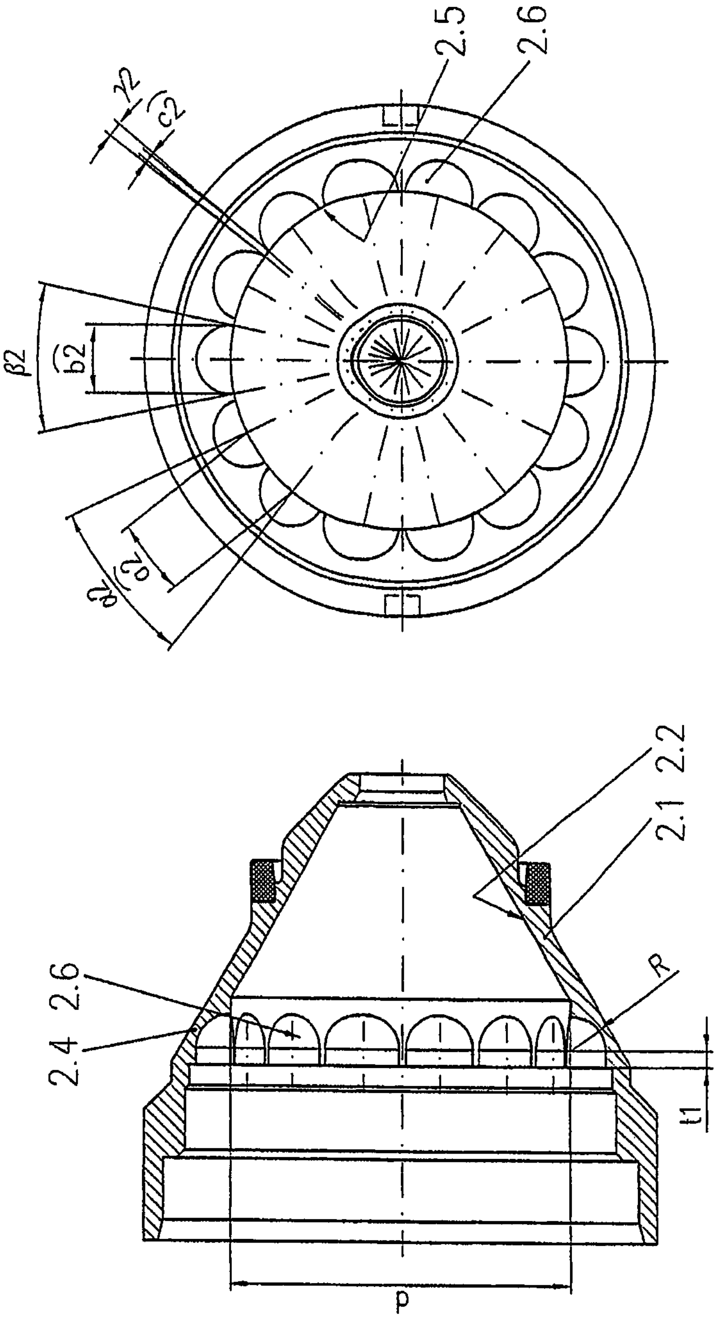
FIG. 7 shows individual illustrations of the nozzle cap 2 used in FIG. 1, left: longitudinal section view; right: view from the left of the longitudinal section.

FIG. 5*b*, is a section view along the line B-B of the plasma torch head from FIG. 7, which depicts the plane of the deflection spaces 10.9 and 10.10.

Figure 6:
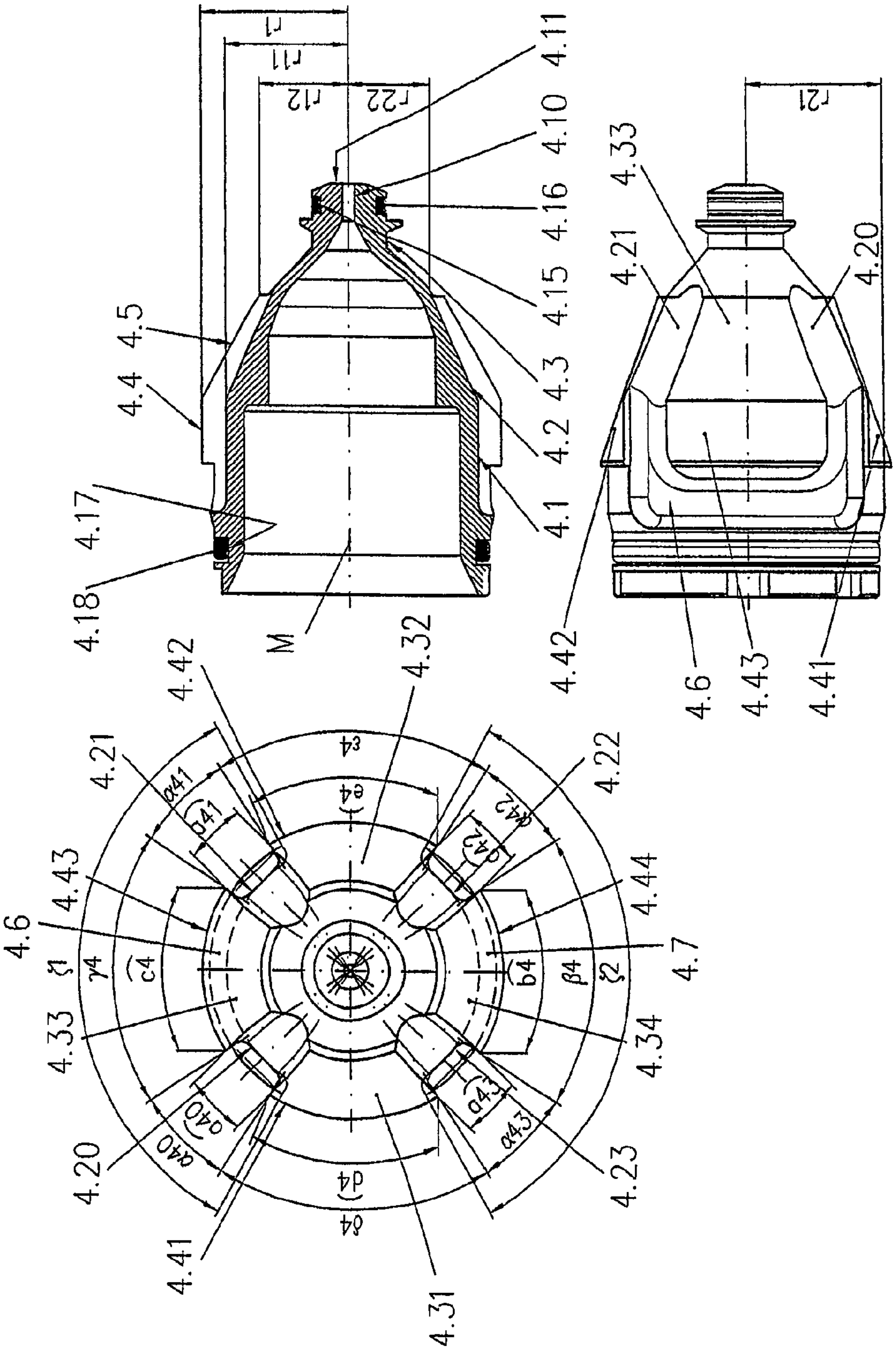
FIG. 6 shows individual illustrations (top left: plan view from the front; top right: longitudinal section view; bottom right: side view) of a nozzle in accordance with a further particular embodiment of the invention.

FIG. 6 depicts the nozzle 4 of the plasma torch head of FIG. 5. A nozzle bore 4.10 for the exit of a plasma gas jet is positioned at a nozzle tip 4.11, a first portion 4.1, the outer surface 4.4 of which is substantially cylindrical, and a second portion 4.2 adjacent thereto towards the nozzle tip 4.11, the outer surface 4.5 of which tapers substantially conically towards the nozzle tip 4.11. The coolant supply grooves 4.20 and 4.21 and the coolant return grooves 4.22 and 4.23 extend over a part of the first portion 4.1 and over the second portion 4.2 in the outer surface 4.5 of the nozzle 4 towards the nozzle tip 4.11 and end before the cylindrical outer surface 4.3. The center point of the coolant supply groove 4.20 and the center point of the coolant return groove 4.22 and the center point of the coolant supply groove 4.21 and the center point the coolant return groove 4.23 are arranged so as to be offset by 180° relative to one another over the periphery of the nozzle 4 and are equal in size. Between the coolant supply groove 4.20 and the coolant return groove 4.22, there is an outwardly projecting region 4.31 with an associated portion 4.41, and between the coolant supply groove 4.21 and the coolant return groove 4.23, there is an outwardly projecting region 4.32 with an associated portion 4.42. Between the coolant supply grooves 4.20 and 4.21, there is an outwardly projecting region 4.33 with an associated portion 4.43. Between the coolant return grooves 4.22 and 4.23, there is an outwardly projecting region 4.34 with an associated portion 4.44.

The invention contemplates that the (angular) widths of the liquid supply grooves may be different than as shown and described herein. The invention further contemplates that the (angular) widths of the liquid return grooves can similarly differ from configuration shown herein within the intended invention scope.

FIG. 7 depicts individual illustrations of a nozzle cap 2 inserted in the plasma torch head 1 of FIG. 1. The nozzle cap 2 has an inner surface 2.2 which tapers substantially conically and which has fourteen recesses 2.6 in a radial plane. The recesses 2.6 are arranged equidistantly over the inner circumference and are semicircular in a radial cross-section.

The features of the invention disclosed in the present description, in the drawings and in the claims will be essential to implementing the invention in its various embodiments both individually and in any combinations. It will be appreciated that additional variations are also possible within the contemplated scope and spirit of the invention.

The invention claimed is:

1. A nozzle for a liquid-cooled plasma torch comprising:

at least two liquid supply grooves and at least two liquid return grooves;

a nozzle tip and a nozzle bore for the exit of a plasma gas jet at said nozzle tip, said nozzle tip having an outer surface;

a first portion of said nozzle, said first portion having an outer surface that is substantially cylindrical, and a second portion of said nozzle, said second portion being adjacent said first portion and positioned towards said nozzle tip the outer surface of said second portion tapering substantially conically toward said nozzle tip;

at least one of a liquid supply groove and a liquid return groove extending over said second portion in said outer surface of said nozzle towards said nozzle tip;

said at least one of a liquid supply groove and a liquid return groove also extends over part of said first portion; and said first portion having at least one first portion groove, said first portion groove being positioned to communicate with at least one liquid supply groove or liquid return groove.

2. The nozzle of claim 1 further comprising:

at least one liquid supply groove and at least one liquid return groove each having a center point; and each liquid supply groove center point and each liquid return groove center point being arranged to be offset by 180° relative to one another over the periphery of said nozzle.

3. The nozzle of claim 1 further comprising at least one liquid supply groove having a width in the range from 10° to 270° in the circumferential direction.

4. The nozzle of claim 1 further comprising at least one liquid return groove having a width that is in the range from 10° to 270° in the circumferential direction.

5. The nozzle of claim 1 wherein the sum of the widths of said at least one of a liquid supply groove and a liquid return groove is between 20° and 340°.

6. The nozzle of claim 1 wherein the sum of the widths of said at least one of a liquid supply groove and a liquid return groove is between 60° and 300°.

7. The nozzle of claim 1 wherein said first portion groove extends over the entire periphery in the circumferential direction of said first portion of said nozzle.

8. The nozzle of claim 1 wherein said first portion groove extends over an angle ζ1 or ζ2 in the range from 60° to 300° in the circumferential direction of said first portion of said nozzle.

9. The nozzle of claim 1 wherein said first portion groove extends over an angle ζ1 or ζ2 in the range from 90° to 270° in the circumferential direction of said first portion of said nozzle.

10. The nozzle of claim 1 further comprising two liquid supply grooves (4.20; 4.21) and two liquid return grooves.

11. The nozzle of claim 10, further comprising:

said nozzle having a longitudinal axis;

each said liquid supply groove and said liquid return groove having a center point;

said two liquid supply grooves being disposed over the periphery of said nozzle symmetrically to a straight line extending from said centre point of said liquid return grooves at a right angle through said longitudinal axis of said nozzle; and said two liquid return grooves being disposed over the periphery of said nozzle symmetrically to a straight line extending from said centre point of said liquid supply grooves at a right angle through said longitudinal axis of said nozzle.

12. The nozzle of claim 11 wherein said centre points of said two liquid supply grooves are arranged so as to be offset relative to one another over the periphery of said nozzle by an angle in the range from 20° to 180°.

13. The nozzle of claim 11 wherein said centre points of said two liquid return grooves are arranged so as to be offset relative to one another over the periphery of said nozzle by an angle in the range from 20° to 180°.

14. The nozzle of claim 10 wherein said two liquid supply grooves and said two liquid return grooves communicate with one another in said first portion of said nozzle.

15. The nozzle of claim 1 wherein said first portion groove extends beyond said at least one of a liquid supply groove and a liquid return groove.

16. A plasma torch head, comprising:

a nozzle comprising at least two liquid supply grooves and at least two liquid return grooves;

a nozzle bracket for holding said nozzle;

a nozzle cap, said nozzle cap and said nozzle forming a coolant chamber which can be connected via two bores, each offset by 60° to 180° , to at least one of a coolant supply line and a coolant return line; and said nozzle bracket being positioned to allow coolant to flow into said coolant chamber in a flow path that is at least one of:

substantially perpendicular to a longitudinal axis of said plasma torch head to encounter said nozzle; and substantially perpendicular to said longitudinal axis out of said coolant chamber and into said nozzle bracket.

17. The plasma torch head of claim 16 further comprising:

said nozzle having a plurality of outwardly projecting portions, each said outwardly projecting portion extending over a projecting portion radian; and said nozzle cap having an inner surface with at least three recesses to form openings facing said nozzle, each said recess extending over an opening radian, wherein said projecting portion radians adjacent, in the circumferential direction, to at least one of said liquid supply grooves and at least one of said liquid return grooves, opposite at least one of said liquid supply grooves and at least one of said liquid return grooves, are at least as great as said opening radian.

18. The plasma torch head of claim 16 wherein said two bores each extend substantially parallel to said longitudinal axis of said plasma torch head.

19. The plasma torch head of claim 16 wherein said bores are arranged to be offset by 180°.

20. The plasma torch head as claimed in claim 17 further comprising:

at least one of said liquid supply grooves having a minimum supply groove radian, at least one of said liquid return grooves having a minimum return groove radian; and a plurality of spacing radians, each said spacing radian being positioned between two of said recesses in said nozzle cap, said spacing radians being no larger than half as large as said minimum supply groove radian and being no larger than half as large as said minimum return groove radian.

21. A liquid-cooled plasma torch comprising:

a nozzle comprising at least two liquid supply grooves and at least two liquid return grooves and having a nozzle tip and a nozzle bore for the exit of a plasma gas jet at said nozzle tip, said nozzle tip having an outer surface;

a first portion of said nozzle, said first portion having an outer surface that is substantially cylindrical, and a second portion of said nozzle, said second portion being adjacent said first portion and positioned towards said nozzle tip, the outer surface of said second portion tapering substantially conically toward said nozzle tip;

at least one of a liquid supply groove and a liquid return groove extending over said second portion in said outer surface of said nozzle towards said nozzle tip;

said at least one of a liquid supply groove and a liquid return groove also extends over part of said first portion;

said first portion having at least one first portion groove, said first portion groove being positioned to communicate with at least one of said liquid supply grooves and said liquid return grooves;

a nozzle bracket for holding said nozzle;

a nozzle cap, said nozzle cap and said nozzle forming a coolant chamber which can be connected via two bores, each offset by 60° to 180°, to at least one of a coolant supply line and a coolant return line; and said nozzle bracket being positioned to allow coolant to flow into said coolant chamber in a flow path that is at least one of:

substantially perpendicular to a longitudinal axis of said plasma torch head to encounter said nozzle; and substantially perpendicular to said longitudinal axis out of said coolant chamber and into said nozzle bracket.

* * * * *